United States Patent [19]
Klingman

[11] Patent Number: 5,721,729
[45] Date of Patent: Feb. 24, 1998

[54] UNIVERSAL INPUT CALL PROCESSING SYSTEM

[76] Inventor: Edwin E. Klingman, 3000 Highway 84, San Gregorio, Calif. 94074

[21] Appl. No.: 590,370

[22] Filed: Jan. 24, 1996

[51] Int. Cl.⁶ .................................................. H04M 11/06
[52] U.S. Cl. .......................... 370/251; 370/264; 370/524; 370/526
[58] Field of Search .................... 370/58.1, 58.2, 370/110.1, 77, 79, 17, 259, 271, 260, 250, 261, 251, 264, 357, 360, 383, 386, 265, 359, 522, 524, 526; 379/211, 219, 220, 221; 395/200.01, 200.16, 200.2

[56] References Cited

U.S. PATENT DOCUMENTS 5,042,028  8/1991  Ogawa .................................. 370/58.2
5,341,377  8/1994  Ohtani .................................. 370/110.1
5,481,605  1/1996  Sakurai et al. ......................... 379/243
5,495,485  2/1996  Hughes-Hartogs ..................... 370/110.1

Primary Examiner—Alpus H. Hsu
Assistant Examiner—Kwang Bin Yao
Attorney, Agent, or Firm—Claude A. S. Hamrick

[57] ABSTRACT

The present invention is directed to an apparatus and method that provides a universal call processing system to process all possible data types transmitted over an ISDN telephone line. A universal call processing system generally comprises an ISDN interface subsystem, a call control subsystem, a call processing subsystem, a controller state machine, and user interface devices.

20 Claims, 4 Drawing Sheets

UNIVERSAL INPUT CALL PROCESSING SYSTEM

BACKGROUND OF THE INVENTION

1. Field of the Invention

This invention generally relates to telephone call processing systems and more particularly to a computerized telephone call processing system utilizing computer hardware and software to process all possible data types transmitted over the ISDN network.

2. Description of the Prior Art

For over half a century, telephone operators were required to manually connect and process calls from calling parties. With the development of rotary dialing, callers can directly dial the directory numbers, bypassing operators. Now, with Dual Tone Multi Frequency (DTMF) or "touch tone" dialing, callers can not only directly dial directory numbers they can also input data via DTMF signals. More recently, Caller ID information and fax tones may also appear on the phone line. While these and other signals have been addressed with various detector means, there is no universal input call processing system capable of handling all of the possible signals originating from a caller.

SUMMARY OF THE INVENTION

It is therefore an objective of the present invention to provide a universal call processing system that can detect and process all information types transmitted through a telephone line via an ISDN network.

It is another objective of the present invention to provide a universal call processing system that can detect and process both standard and proprietary information packets transmitted through a telephone line via an ISDN network.

It is yet another objective of the present invention to provide a universal call processing system that can be programmed to provide custom responses and processing for the received information.

The present invention is directed to an apparatus and method that provides a universal call processing system to process all possible data types transmitted over the ISDN network. Briefly, a universal call processing system in accordance with the preferred embodiments of the present invention includes an ISDN interface subsystem, a call control subsystem, a call processing subsystem, a controller state machine, and user interface devices.

An advantage of the present invention is that it can detect and process all information types transmitted through a telephone line via an ISDN network.

Another advantage of the present invention is that it can detect and process both standard and proprietary information packets transmitted through a telephone line via an ISDN network.

Yet another advantage of the present invention is that it can be programmed to provide custom responses and processing the received information.

IN THE DRAWINGS

DETAILED DESCRIPTION OF THE PREFERRED EMBODIMENTS

The present invention is directed to a universal call processing system designed to identify and process incoming calls from the ISDN network using either standard protocols or proprietary protocols, and to provide the capability to respond to signals associated with the calling party or inputted by the calling party. The call processing system takes advantage of two available technologies: the ISDN public phone system and personal computers. An embodiment of the present invention is comprised of an ISDN terminal adapter hardware and driver software that executes in a personal computer. An example of the hardware is the ISDN*tek "Enterprise Card", and an example of the software is the ISDN*tek "WinISDN.DLL". The driver software conforms to a widely adopted Application Programming Interface (API) that allows application programmers using "C", "C++", Visual Basic, Pascal, or Assembly languages to utilize the call processing system via the driver software.

Figure 1:
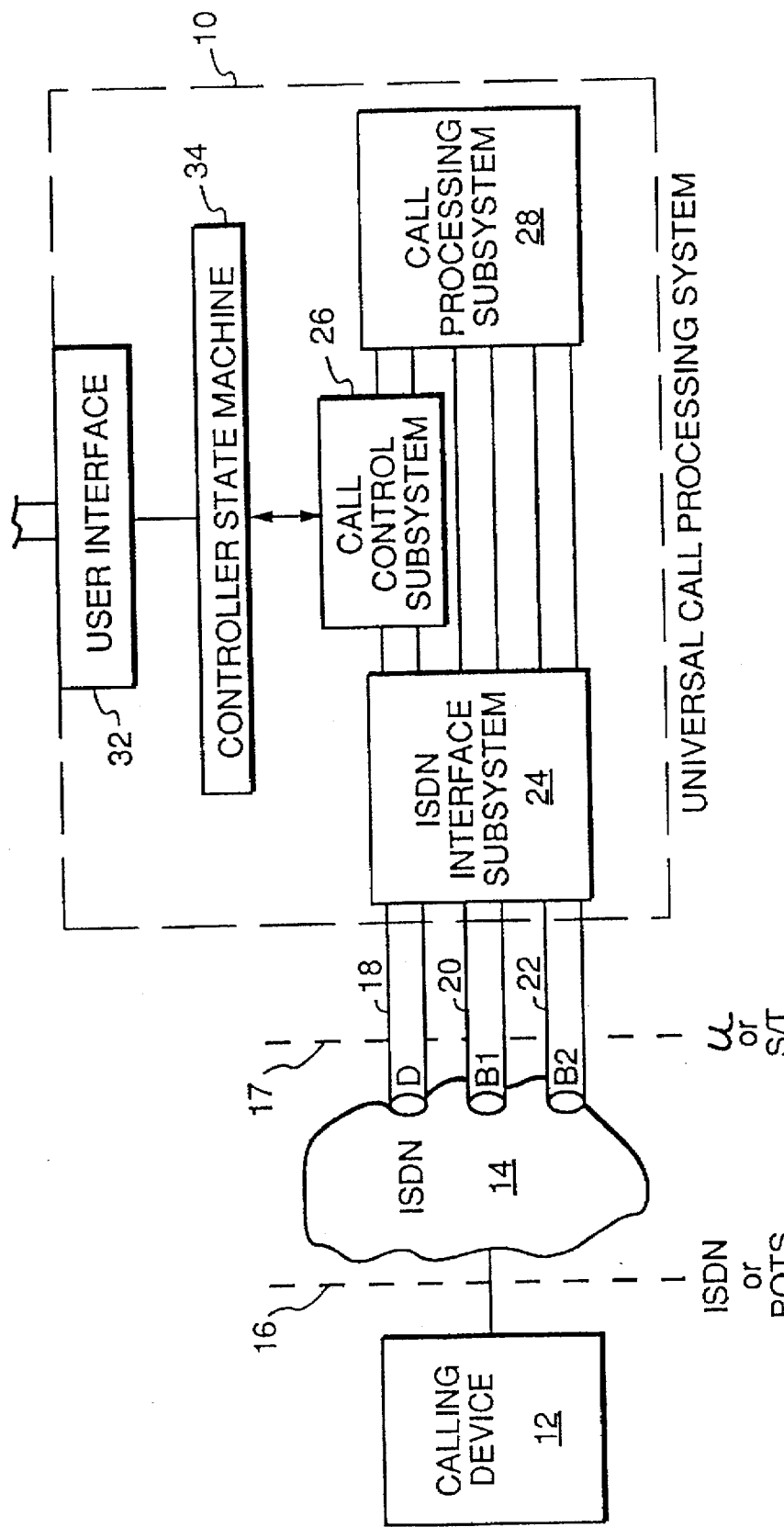
FIG. 1 is a block diagram generally illustrating a universal input call processing system in accordance with the present invention.

Referring to FIG. 1, there is shown a system 10 for processing calls placed by a caller 12 through an ISDN network 14. The caller interface 16 to the telecommunication system can be either POTS (Plain Old Telephone Service) or ISDN. However, the ISDN interface subsystem 24 of system 10 to the ISDN network 14 must be through an ISDN Basic Rate Interface 17, either an S/T type or a U type as described by ITU ISDN Recommendations, where two B-channels 20, 22 and a D channel 18 are supported. The ISDN interface subsystem 24 can support either an S/T or U interface. The call control subsystem 26 communicates with the ISDN network over the D-channel as described by ITU Q.921 and Q.931, and can be achieved by using an ISDN controller such as the Cybernetic Micro Systems ISDN controller (CY123) or equivalent.

The call processing subsystem 28 accepts data from the D-channel or from one or more of the B-channels and analyzes the data as described in the operation of the invention. The Controller State Machine 34 receives and transmits call control information from and to the call control subsystem 26, and also communicates with the call processing subsystem 28. The Controller State Machine 34 has an internal interface which in the preferred embodiment is described by the open specification WinISDN. The internal interface, WinISDN provides the linking mechanism between the hardware and driver software common to all preferred embodiments and the application-specific software. The application software controls the user interface subsystem 32.

Figure 2:
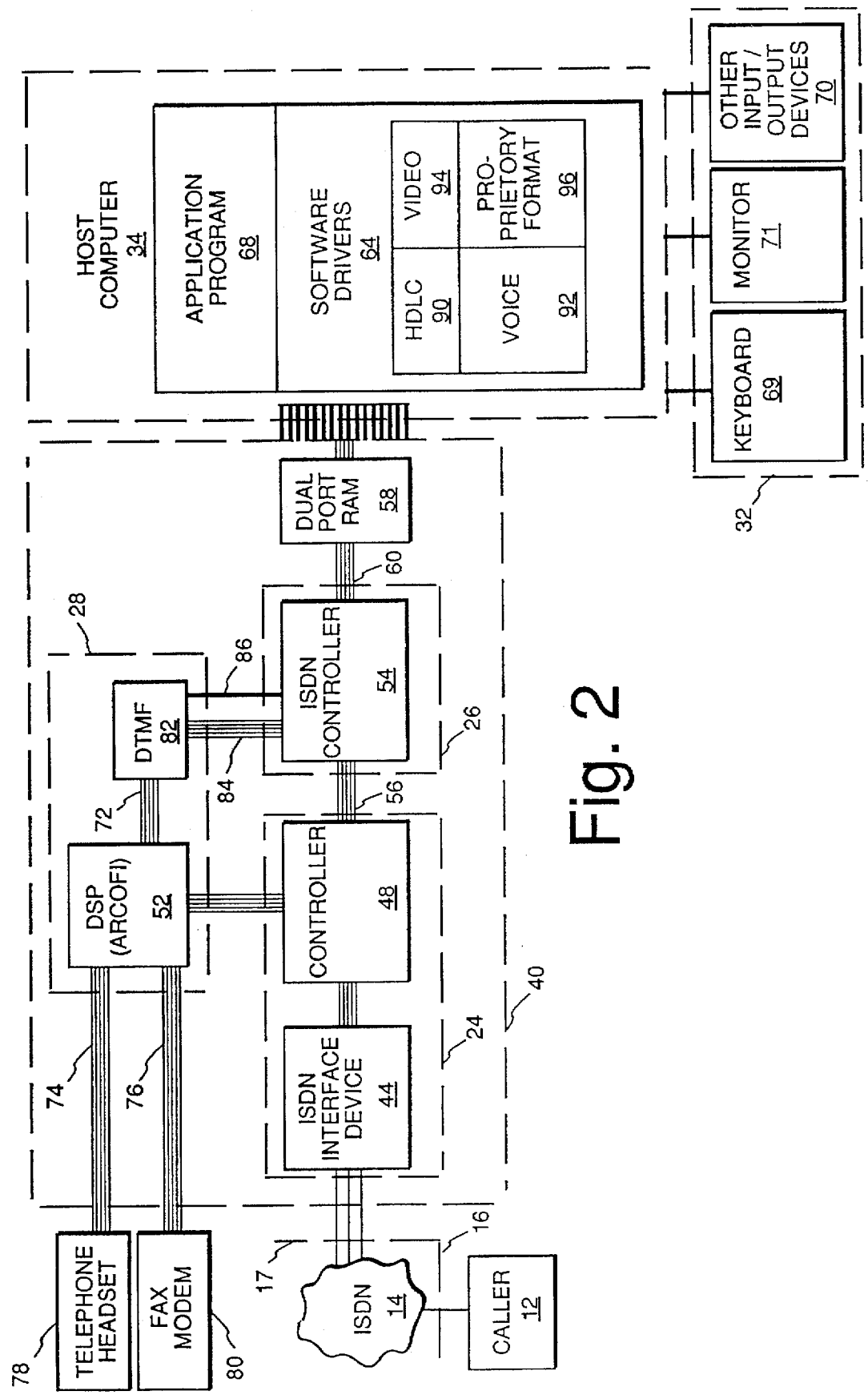
FIG. 2 is a block diagram further illustrating the preferred embodiment and the subsystems involved in processing calls according to the invention.

Referring to FIG. 2, the specific subsystems comprising certain aspects of the preferred embodiment of the universal call processing system 40 are shown. The ISDN interface subsystem 24 is comprised of a ISDN interface device 44, and a controller 48. The ISDN interface device 44, a Siemens 2091 in the preferred embodiment, provides U-Type interface functionality and communicates through an IOM interface, to a controller 48, which is a Siemens 2085 controller in the preferred embodiment. The controller 48 also communicates through an IOM interface to a digital signal processor (DSP) 52, a Siemens 2163 ARCOFI in the preferred embodiment. The call control subsystem 26 is comprised of an ISDN controller 54, which is a Cybernetic Micro System component, CY123, in the preferred embodiment. It operatively communicates with controller 48 via a microcontroller bus 56 over which it also communicates with ISDN interface device 44, and digital signal processor 52.

The ISDN controller 54 reads and writes information to a dual port RAM 58 via bus 60. Through the dual port RAM, information is passed and received from the controller state machine 34, a personal computer in the preferred embodiment. The application program 68 operates under DOS, Windows, or OS/2 operating systems and interfaces with the hardware through the software driver 64 and its modules (90, 92, 94 and 96) as described by WinISDN or an equivalent protocol. The application program 68 is the primary component of the controller state machine. User interface is provided by input and output devices such as display screen 71, keyboard 69, or other input and output devices 70 such as disk drives, CD ROMs, etc.

The components of the preferred embodiment are well known devices with interfaces well defined. The application program itself provides the flexibility to adopt the call processing features of the system to a variety of applications.

Data from the B channel originates from the caller 12, and enters the call processing system at the ISDN interface 17. The B-channel data traverses ISDN interface device 44, and enters controller 48. B-channel data can exit controller 48 on two separate paths. The data can be processed by ISDN controller 54 or other devices in this path. B-channel data can also exit controller 48 and be processed by DSP (ARCOFI) 52 and associated subsystems. B-channel data enters the ARCOFI as digital data, and exits the ARCOFI as analog data. The ARCOFI can have a plurality of analog inputs and outputs, and B-channel data can be outputted simultaneously on different output ports. For example, ARCOFI 52 can be connected to a user handset 78 via bus 74 or to a modem 80 via bus 76. In addition, B-channel data in analog form can be outputted from ARCOFI 52 to a DTMF detector device 82 via bus 72. The DTMF detector, a Fujitsu 87017B in the preferred embodiment, connects to ISDN controller 54 via data bus 84 and control signals are communicated via line(s) 86.

Also shown are auxiliary software driver modules. The driver module 64 includes HDLC 90, H.320 94, Voice recognition 92, and proprietary protocols 96.

Note that the call control subsystem of the present invention is described in patent applications entitled Ring Communication System using ISDN (Ser. No. 08/486,007) and Byte Aligned Computer-to-Computer Communications System (Ser. No. 08/370,965).

OPERATION OF THE INVENTION

The universal input call processing system is designed to handle a wide variety types of calls, including the following types: Caller ID, user-to-user, DTMF signals, G3/facsimile signals, voice energy, HDLC, Video H.320, Video H.221, Video H.261, other standard protocols, and proprietary protocols. Having described the preferred embodiment of the present invention, processing of the various possible types of information from the D channel and the B channels are now described.

D-Channel Information Elements

The operation of the invention begins with the checking of an incoming call from a caller. This incoming call event is characterized by a SETUP message in the D-channel and is detected by ISDN controller 54. The ISDN controller copies the message and any accompanying information elements into the dual port RAM 58, extracts certain information elements, such as caller ID, bearer capability, user-user information, etc, and interrupts the driver software 64.

If the application program interacting with the driver software has requested notification of this event, the caller ID will be passed to the application program, where it may be displayed on a computer monitor, used as an index/key in a data base search, passed to an agent, or otherwise processed. The present invention provides the necessary measures for enabling caller ID processing, and detects, formats, and delivers caller ID information in the same manner regardless of its eventual use.

Although Caller ID is the most prevalent caller information passed over an ISDN line where the call may originate from a calling party using either a POTS line or an ISDN line, if a calling party uses ISDN equipment, there are other possible information elements in the SETUP message. In particular, the bearer capability information element (described by ITU Q.931) will provide information regarding the call type (such as voice, data, video, etc.).

In addition, the ISDN controller can pass the bearer capability information (the Q.931 messages) in its entirety to the application program, allowing the processing of any specifically tailored information elements which may not be readily recognized by the ISDN controller but can be extracted by appropriate application program written to the driver software (WinISDN API). In this manner, all current and future caller information elements can be detected, formatted, and passed to the application program.

ISDN information elements on the D-channel follow the Q.931 message element, and each element contains three consecutive blocks of information. This first block is the "Info_El" block, the second block is the "Length" block, and the third block is the "Data" block. A non-zero Info_El block identifies the meaning of the element, the Length block specifies the number of data bytes in the Data block, and information in the Data block is interpreted as indicated by the Info_El block. Accordingly, information elements with specifically tailored formats that may be defined in the future can be managed and parsed by the ISDN controller. In such a case, such information elements are presented to the driver software, which can be configured to handle new information elements.

The call processing system must either determine the type of user data appearing on the B-channel by interpreting bearer capability information associated with the incoming call or by analyzing the actual data in the B-channel. Because bearer capability information does not unambiguously define the user data type, the present invention analyzes B-channel data for all possible call types regardless of bearer capability information. Note that 56K or 64K transport speed can be used in interpreting B-channel data.

B Channel Data

Having thus provided a means of handling present and future caller information appearing on the D-channel, the caller information appearing on the B-channel(s) is considered. Because D-channel packets are HDLC packets described by ITU Q.921 and LAPD, their processing is similar regardless of the content of the particular information elements.

In contrast, caller information appearing on the B-channel can take many forms, and the present invention has the ability to detect and process each of these forms. The two primary classifications of the B-channel data are digital and analog. Although all B-channel data is digitized, the 8 KHz sample rate is guaranteed by the Nyquist criterion to allow reproduction of analog signals in a 4 KHz bandwidth. In general, the bearer capability information element will distinguish between digital and analog connections. However, one may wish to analyze all B-channel data since it is possible in many cases to send digital data over a voice call or voice data over a digital call. Thus, the specified call type as recorded by the D-channel may not be correct and can be ignored. Therefore, all B-channel data regardless of the indicated call type should be analyzed.

Since each call type is an unique signal and has associated signal properties, in analyzing B-channel data these signal properties will be used to identify the calls type. While data calls are characterized by message formats, analog calls tend to be characterized by physical features such as spectral energy, characteristic frequencies, etc. A key difference between analog and digital signals tends to be that digital data has meaning on a byte-to-byte basis, whereas analog data has meaning only when analyzed over a data sequence, because the concepts of frequency and wavelength do not just apply to a single sample data point.

Because each ISDN B-channel accepts and produces a byte every 125 microseconds and computers execute instructions in fractions of a microsecond, there is sufficient time to analyze each data byte as well as a sequence of data bytes received from the caller.

DTMF Tones Detection and Processing

DTMF tones ("touch tones") are typically generated in response to voice announcements. These voice announcements can be digitized and stored on a computer disk or other storage devices as described in the WinISDN Software Developer's Kit (SDK) and implemented by an ISDN card such as the ISDN*tek Commuter Card or the ISDN*tek Enterprise Card. The application program can read the digitized DTMF byte sequence and send the corresponding voice announcement data sequence to the WinISDN driver software and the ISDN controller where the bytes are output to the B-channel connected to the caller. If the caller uses standard telephone speaker equipment, the digitized voice can be converted to audio output to provide audio instructions to the caller. In response to the instructions the caller may generate DTMF signals which are received and decoded by the preferred embodiment of the present invention.

Because DTMF tones utilize two frequencies, they are not easily detectable by the ISDN controller, and a DTMF detector is used. In the preferred embodiment, the Fujitsu 87017B DTMF detector is used.

The application program can also issue a Listen_for_DTMF() function call to the WinISDN driver software to cause the ISDN controller to enable DTMF detection. In this case the ISDN controller 54 causes the B-channel data to be outputted in analog form through bus 72 to the DTMF detector 82. The ISDN controller then periodically polls for a detect signal from the DTMF detector 82 via lines 86. When the detect signal is active, the DTMF device 82 has detected two tones of correct frequency for a specified duration, and the coded description is available on bus 84. The ISDN controller enables the bus via a control signal that crosses lines 86. The ISDN controller shares the pins of bus 84 with outgoing address lines, and these lines are driven high by the ISDN controller before the DTMF code bus 84 is enabled. The ISDN controller then reads the code from bus 84, disables the output of detector, and places the formatted DTMF code in dual port RAM 58 before interrupting driver 64. The driver notifies the application program 68 of the DTMF event.

The application program is programmed to interpret incoming DTMF tones, or to issue further voice announcements. Several voice announcements may be required before the application program obtains sufficient information to process the call.

Fax Tone Detection and Processing

Fax signals are typically preceded by a pure 300 Hz tone, a single frequency signal. This 300 Hz tone can be detected by a threshold crossings calculation method, which can be performed by either the ISDN controller or the driver software. This task can be accomplished by the driver software when the WinISDN Listen_for_Modem() function call is issued.

Either the ISDN controller 54 or the driver software 64 can count threshold crossings in order to determine whether there is a 300 Hz tone. Since B-channel data is sampled over 125 micro seconds, timing is achieved by counting the threshold crossings, and a 300 Hz tone should exhibit 300 monotonic crossings per 8000 cycles. One primary significance here is that this counting can occur in parallel (i.e., simultaneously) with other data analysis.

If counting is performed by the ISDN controller, upon detection of a 300 Hz tone, the ISDN controller 54 interrupts the driver software 64 with an appropriate event notification. If the driver software performs the 300 Hz threshold crossing test, the driver will alert the application program via the standard event notification mechanism of WinISDN. In either case, the application program may bring the fax modem "online". If the fax modem device 80 is an integral unit, it may be activated by the ISDN controller via ARCOFI I/O signals and may connect to the B-channel via the ARCOFI analog front end via bus 76. If an external fax modem is used, bus 76 may be replaced by a 4 wire-to-2 wire hybrid transformer and the ISDN controller may be used to drive the circuitry necessary to produce ringing voltage.

Voice Detection and Processing

The processing of DTMF signals and fax signals depends on the well defined frequency characteristics of these signals. The detection of spoken voice depends not on frequencies so much as spectral energy. This energy is measured as threshold crossings versus time, and can be performed by a digital signal processor such as the Siemens 2163 ARCOFI, the ISDN controller, or the WinISDN driver software.

The 2163 ARCOFI uses peak detection to bridge the trough between speech bursts, and uses time constraints (PDS & PDN) to discriminate between noise and speech, which is described in Siemens PSB 2163 preliminary data sheet. Similar processing can be performed by the ISDN controller or the driver software. Note that the ISDN data rate of 125 microseconds/byte simplifies timing to merely counting data bytes.

The Siemens 2163 is a digital signal processor specifically tailored to speech processing. Although the 2163 ARCOFI can enhance speech and reduce noise in the B-channel, there is no actual signal from the device to the ISDN controller. Therefore, the actual detection of speech is managed by either the ISDN controller or the driver software, and detection can be achieved by timing threshold crossings. If the speech signal exceeds the threshold for a specific duration, the ISDN controller or driver software reports a speech signal on the line. These threshold and duration values are software programmable.

During the tests the software driver or the ISDN controller can determine how long the digital data remains above a chosen threshold. This test is designed to distinguish voice energy from noise spikes, which are of shorter duration than spoken data. If the energy spectrum measured by this test indicates the presence of non-noise on the line and all other tests have failed, then there is voice energy on the line and the driver can notify the application program of such event. The application program can either cause the analog data to be piped to the telephone headset or to a voice recognition module, depending upon the availability of a human operator or a voice recognition subsystem, respectively.

When voice has been detected and the application program has been notified, the application program can take one of many available actions, depending on the hardware and software configuration in the system or the presence of an operator. These actions include: the B-channel may be switched to a human operator interface (speaker/microphone) if an operator is present; the B-channel may be switched to a voice recognition subsystem or a voice mail system if such a subsystem is present; the B-channel may be driven by voice announcements asking the user to input DTMF tones; or the B-channel may be re-rerouted, by an ISDN call control device, to a remote agent, either human or otherwise.

Digital Data Detection and Processing

Digital data on ISDN B-channels typically are compatible with most router and terminal adapters, and are consistent with Point-to-Point Protocol (PPP) packets, either synchronous-PPP or octet-synchronous PPP. In either type of PPP packets, HDLC framing is used. More specifically, bit-oriented HDLC for sync-PPP and byte-oriented HDLC for octet-sync-PPP are used. Common to each HDLC format is the use of "flags", represented as a 01111110 bit sequence. Thus, a method to detect the flags is required for HDLC data detection. The ISDN controller is capable of detecting octet-sync-PPP since all flags are byte-aligned. The WinISDN driver software is capable of detecting either byte or bit-aligned flags, and is capable of detecting and decoding HDLC packets, including the frame check sequence (FCS). The WinISDN API provides event notification mechanisms to report HDLC packets to the application program, which will handle specific PPP packets from the caller. Typically, the receipt of PPP packets from a caller implies a caller capability of receiving response packets, and thus the application program may provide PPP responses, such as PAP or CHAP.

All internal flags being suppressed by bit-stuffing are well known in the data communication field, and the flags are detected by the WinISDN driver as a normal part of data processing. If flags are detected, the driver enters a wait-for-non-flag state and the first non-flag data encountered is assumed to be the first byte of the data packet. A frame check sequence (FCS) is computed over all incoming data bytes, and this is compared to the FCS that immediately precedes the closing flag. If the FCSs agree, the driver notifies the application program of the received packet event and processing is continued by the application program. Normal processing includes TCP/IP, X.25, and FRAME RELAY packet interpretation and response.

Although standard data communication uses HDLC framing, the ISDN controller supports Memory-to-Memory byte synchronous transfers and is therefore capable of transferring proprietary packets over an ISDN line. These packets can be detected by the ISDN controller, the WinISDN driver, or the application program as appropriate. However, this feature is useful only in the case of calls from callers who share such proprietary protocols.

Video Detection and Processing

More recently, video teleconferencing applications have become popular, and the international standard H.320 uses H.221 framing for sending video packets across B-channels. The driver can examine incoming data for H.221 framing by looking for the sync pattern appearing in the one bit "track" as described by ITU H.221 recommendations. If such framing is detected, the packets can be passed to the video processing subsystems.

Unlike standard data communication, the ITU H.320 video conferencing protocols (H.320, H.221-framing, H.261-encoding) are not HDLC based. Such protocols can be detected and decoded via software applications (such as VIVO.320) and driver or application software can be written to detect such data. If drivers to detect H.320 type video data are provided, the corresponding event notification can be handled by the application software. Otherwise, the application software can be programmed to detect and handle video data. As described above, all current caller data types can be detected and processed, or passed off to processing subsystems.

Figure 3A:
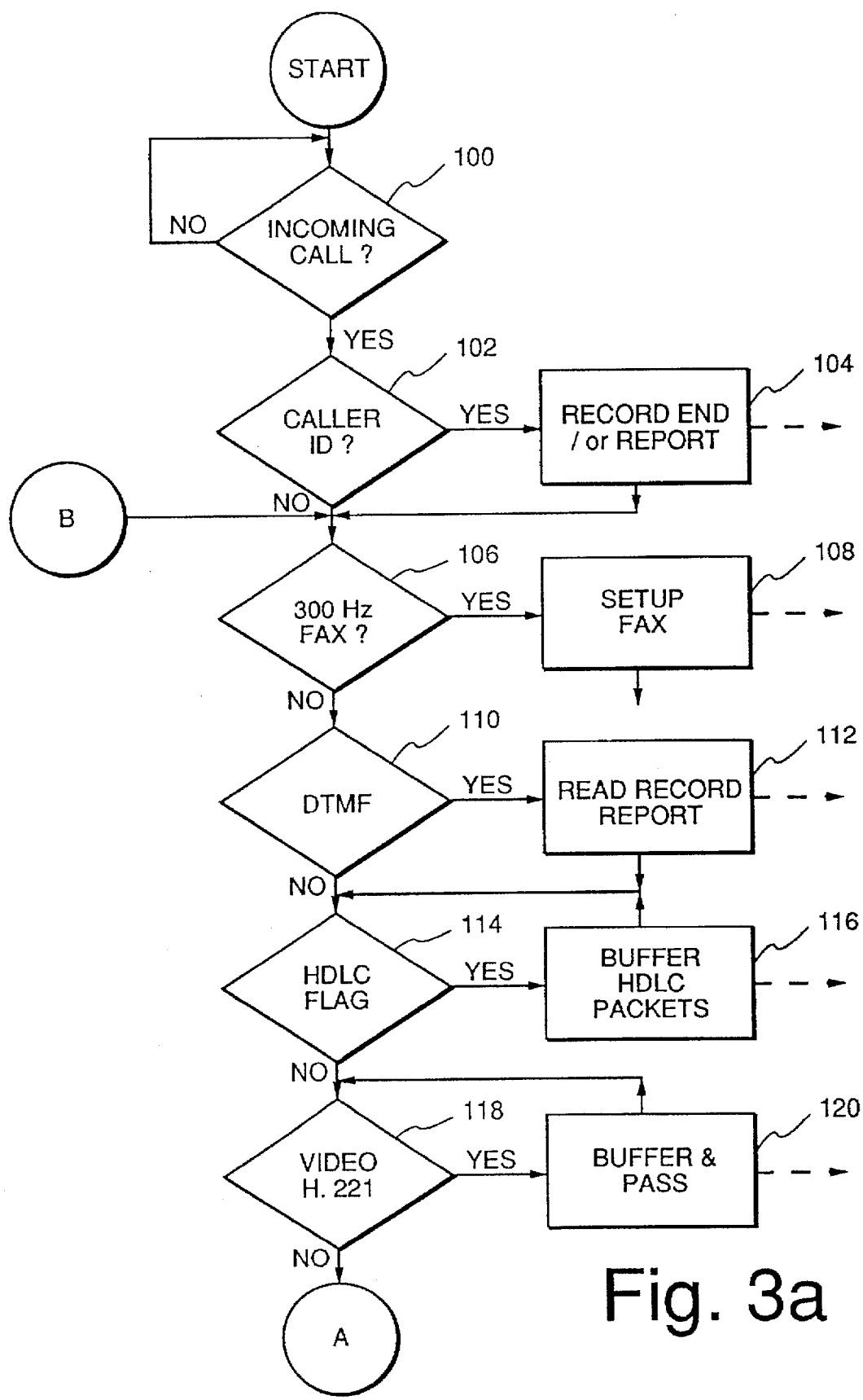
FIGS. 3A and 3B show a flow chart illustrating the sequence of tests performed by the system software to detect incoming calls in accordance with the present invention.
Figure 3B:
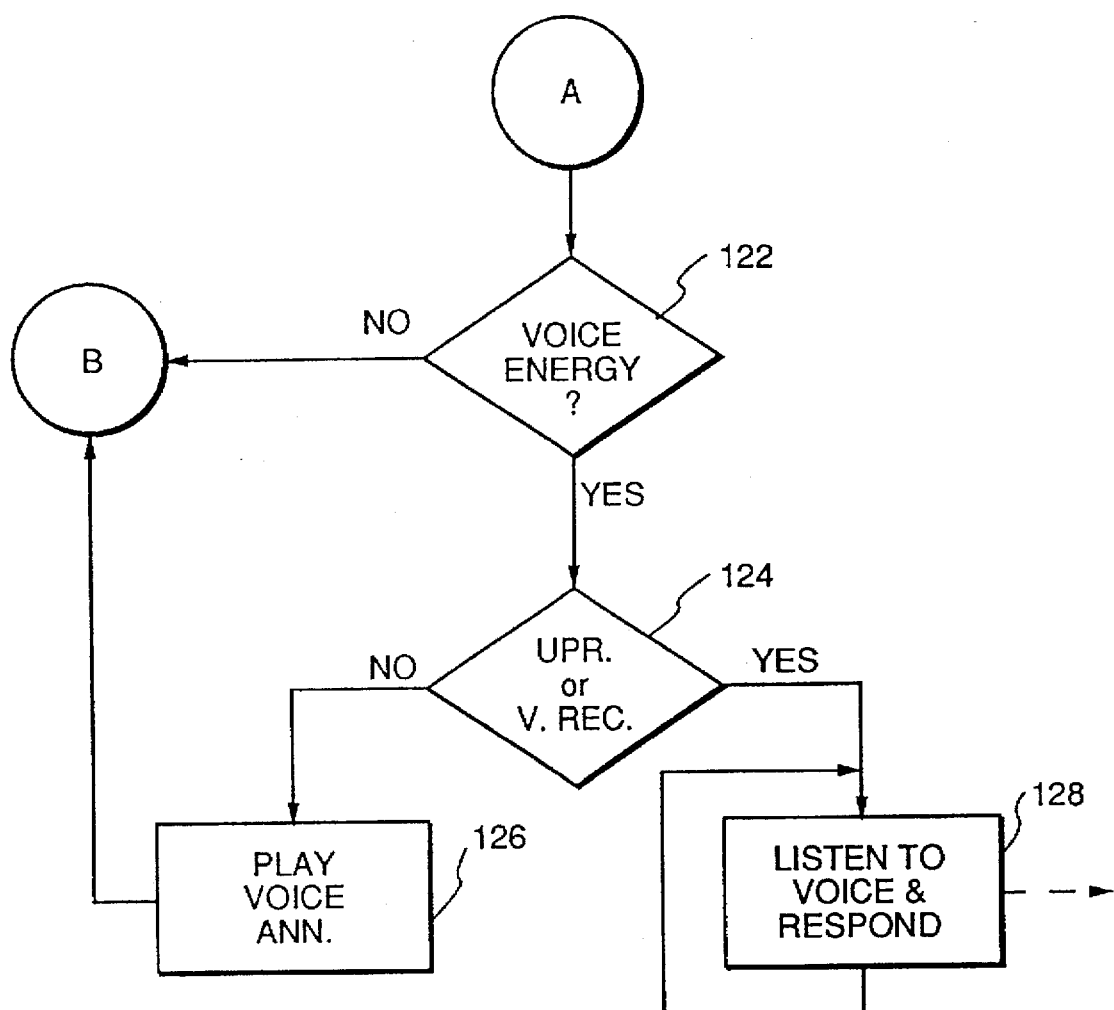

FIGS. 3A and 3B present a flow chart for the testing of an incoming call in a universal call processing system. While the flow chart depicts testing in a sequential manner, it is understood that testing may be done in a parallel fashion.

Referring to FIG. 3A, the system continuously polls for an incoming call as indicated by decision box 100. Upon detection of an incoming call, caller-ID information is checked first (102) and, if found, it is processed accordingly as indicated by box 104. Next, the system checks for a fax signal (106) and, if found, it is processed accordingly (108). If a fax signal is not found, the system checks for DTMF signals (110). If DTMF signals are not found, data packets are checked next by looking for HDLC flags (114). If data packets are not found, video signals are checked next (118). Referring to FIG. 3B, if the data is not video packets, voice energy is checked next (122). If there is no voice energy, the checking process is repeated via connector B of FIG. 3B to connector B of FIG. 3A to again attempt to identify the data type. If there is a voice energy, voice announcement may be played back (126) to instruct the caller or it may be otherwise processed (128).

It is expected that only one of the tests will produce positive results, leading to one appropriate response to the detected input data. The present invention is independent of the sequence of tests, and depends only on the fact that the data are orthogonal, that is, only one type of data is expected on the B-channel at a given time.

Note that upon establishing a connection, most data devices put "flags" on the line to allow the other end to sync to the null data state. The result is that the data type can generally be detected in a very brief period after a successful connection. In contrast, most people do not immediately begin speaking upon connection, but instead there is a pause while the headset is brought to the head. Thus, in evaluating the B-channel data types, the packet connections are expected to show up before voice data, and the system should therefore perform data tests before voice energy tests, unless there is good indication that voice is expected, rather than data.

In the present invention, a low cost DTMF detection circuit is chosen to analyze incoming caller signals for the presence of touch tones. All other processing is performed on the digital data. It is important to note that the digital data comes through the B-channel at 8000 bytes per second, while the ISDN controller is clocked at approximately 20 million cycles per second and the host processor executing the driver is typically clocked from 33 MHz to 133 MHz. Thus, these two processors, both of which have access to the 8000 sample/sec data stream, are capable of performing millions of operations per second on the data, and can easily perform the above tests in real time.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What I claim is:

1. A call processing system for use in connecting to an ISDN network having at least a D channel and one or more B channels, and for receiving, identifying, and processing information from the network so that such information can be communicated or used to interact with a computer, said system comprising:

an ISDN interface device for effecting communicative connection to an ISDN network to receive data from and to transmit data to the ISDN network;

an ISDN controller communicatively connected to said interface device for detecting and identifying data received from the ISDN network via said interface device, and for providing data identifying signals; and computer means including driver means communicating with said ISDN controller for receiving said data identifying signals and the data, and being operative to decode the data, said driver means containing means for identifying Caller-ID information, HDLC packets, fax tones, video data packets, voice energy, and proprietarily formatted data packets, and program means responsive to said data identifying signals and the decoded data and operative to interact with said driver means to process the decoded data.

2. A call processing system as recited in claim 1 wherein said program means is further operative to interact with said driver means to generate a responsive signal for return to the ISDN controller for transmission over the ISDN network or for input to a selected peripheral.

3. A call processing system as recited in claim 2 wherein the selected peripheral is a fax/modem connected to said digital signal processor for receiving and transmitting the processed responsive signal.

4. A call processing system as recited in claim 2 wherein the selected peripherals include a microphone and a speaker communicatively connected to said digital signal processor for receiving and transmitting the processed responsive signal.

5. A call processing system as recited in claim 2 and further comprising a DTMF detector communicatively connected to said ISDN controller to detect DTMF tones.

6. A call processing system as recited in claim 5 and further comprising a memory storage unit connected between said ISDN controller and said driver means to provide a storage means for data communication between said ISDN controller and said driver means.

7. A call processing system as recited in claim 1 and further comprising a digital signal processor communicatively connected to said ISDN interface device to receive and process said responsive signal.

8. A call processing system as recited in claim 1 and further comprising a DTMF detector communicatively connected to said ISDN controller to detect DTMF tones.

9. A call processing system as recited in claim 1 and further comprising a memory storage unit connected between said ISDN controller and said driver means to provide a storage means for data communication between said ISDN controller and said driver means.

10. A call processing system as recited in claim 1 wherein user-input devices are communicatively connected to said host computer to communicate with said program means.

11. A call processing system as recited in claim 1 wherein said driver means is programmed to identify proprietary information elements on said D channel and proprietary data packets on said B channels.

12. A call processing system as recited in claim 1 wherein said program means is programmed to identify a proprietary information element on said D channel and proprietary data packets on said B channels.

13. A call processing system for use in connecting to an ISDN network having at least a D channel and one or more B channels, and for receiving, identifying, and processing information from the network so that such information can be communicated or used to interact with a computer, said system comprising:

an ISDN interface device for effecting communicative connection to an ISDN network to receive data from and to transmit data to the ISDN network;

an ISDN controller communicatively connected to said interface device for detecting and identifying data such as caller-ID information, HDLC data packets, fax tones, DTMF tones, video data, and voice energy received from the ISDN network via said interface device, and for providing corresponding data identifying signals; and computer means including driver means communicating with said ISDN controller for receiving said data identifying signals and the data, said driver means being operative to decode the data, and program means responsive to said data identifying signals and the decoded data and operative to interact with said driver means to process the decoded data.

14. A call processing system for use in connecting to an ISDN network having at least a D channel and one or more B channels, and for receiving, identifying, and processing information from the network so that such information can be communicated or used to interact with a computer, said system comprising:

an ISDN interface device for effecting communicative connection to an ISDN network to receive data from and to transmit data to the ISDN network;

an ISDN controller communicatively connected to said interface device for detecting and identifying data received from the ISDN network via said interface device, and for providing data identifying signals;

a DTMF detector communicatively connected to said ISDN controller to detect DTMF tones;

driver means containing means for identifying Caller-ID information, HDLC packets, fax tone, video data packets, voice energy, and proprietarily formatted data packets;

program means programmed to identify a proprietary information element on said D channel and proprietary data packets on said B channels; and a memory storage unit connected between said ISDN controller and said driver means to provide a storage means for data communication between said ISDN controller and said driver means.

15. A call processing system as recited in claim 14 wherein user-input devices are communicatively connected to said host computer to communicate with said program means.

16. A call processing system as recited in claim 15 wherein said driver means is programmed to identify proprietary information element on said D channel and proprietary data packets on said B channels.

17. A call processing system for use in connecting to an ISDN network having at least a D channel and one or more B channels, and for receiving, identifying, and processing information from the network so that such information can be communicated or used to interact with a host computer, said system comprising:

- an interface device for effecting communicative connection to an ISDN network to receive data from and to transmit data to the ISDN network;
- a controller device communicatively coupled to said interface device for routing the data and for operating associated subsystems;
- an ISDN controller operatively connected to said controller device for detecting and identifying the data received from the ISDN network and for providing data identifying signals;
- a digital signal processor communicatively connected to said controller device for detecting voice components in the data and for processing stored voice announcements;
- a DTMF detector operatively connected to said digital signal processor and said ISDN controller for detecting DTMF tones from the data;
- driver means residing in the host computer for communicating with said ISDN controller, for receiving said data identifying signals, and for decoding the data, said driver means being operative to identify HDLC data, video data, voice energy and proprietary formatted data;
- program means residing in the host computer for interacting with said driver means to process said signals and the data, and for generating responses to said signals and the data; and
- digital storage means for storing data received from said ISDN network.

18. A call processing system as recited in claim 17 wherein a memory storage unit is connected between said ISDN controller and said driver means.

19. A call processing system as recited in claim 18 wherein user-input devices are communicatively connected to said host computer to communicate with said program means.

20. A method for processing data transmitted through an ISDN network having at least one D channel and one or more B channels, wherein said transmitted data is of one type of several possible types, and information element identifying said data type are transmitted on said D channel, and said data is transmitted on said B channels, comprising the steps of:

- responding to incoming ISDN call events, wherein each incoming call includes an information element on said D channel and data of a particular type on said B channels;
- processing the information element on said D channel to determine caller-ID information and the call type;
- if the call type detected on said D channel is unique, then respond, else test B channels by identifying the data type of said received data on said B channel by checking for a fax tone;
- if said received data is not identified, identifying the data type of said received data by checking for DTMF tones;
- if said received data is not identified, identifying the data type of said received data by checking for an HDLC flag;
- if said received data is not identified, identifying the data type of said received data by checking for video formatted data;
- if said received data is not identified, identifying the data type of said received data by checking for voice energy; and
- responding to said received data according to at least the identified data type and the call type.

* * * * *